United States Patent
Lin et al.

(10) Patent No.: US 11,442,352 B2
(45) Date of Patent: Sep. 13, 2022

(54) LIGHTING SYSTEM AND PROJECTION APPARATUS

(71) Applicant: Coretronic Corporation, Hsin-Chu (TW)

(72) Inventors: Yao-Shun Lin, Hsin-Chu (TW); Hsuan-I Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/926,750

(22) Filed: Jul. 12, 2020

(65) Prior Publication Data

US 2021/0018824 A1   Jan. 21, 2021

(30) Foreign Application Priority Data

Jul. 15, 2019   (CN) .......................... 201910635434.1

(51) Int. Cl.
*G03B 21/14* (2006.01)
*G03B 27/28* (2006.01)
(Continued)

(52) U.S. Cl.
CPC ......... *G03B 21/208* (2013.01); *G02B 27/286* (2013.01); *G03B 21/204* (2013.01); *G03B 21/2013* (2013.01)

(58) Field of Classification Search
CPC ...... H04N 9/31; H04N 9/3167; G02B 27/286; G02B 27/28; G03B 35/18; G03B 21/208;
(Continued)

(56) References Cited

U.S. PATENT DOCUMENTS 6,498,869 B1   12/2002 Yao
6,535,273 B1*   3/2003 Maul .................... G03F 7/70066
                                                          355/67
(Continued)

FOREIGN PATENT DOCUMENTS

CN    106104376    11/2016
CN    208984937    6/2019
(Continued)

OTHER PUBLICATIONS

"Search Report of Europe Counterpart Application", dated Dec. 1, 2020, pp. 1-6.
(Continued)

*Primary Examiner* — William C. Dowling
(74) *Attorney, Agent, or Firm* — JCIPRNET (57) ABSTRACT

The present invention provides a lighting system, including at least one light source, a depolarization element and a light homogenization element. The at least one light source is configured to provide at least one light beam. The depolarization element is disposed on a transmission path of the at least one light beam. The depolarization element includes a first optical element, and the first optical element is provided with a first optical axis. The light homogenization element is configured to allow the at least one light beam to pass to form an illuminating light beam. The incident direction where the at least one light beam is transmitted to the first optical element is not parallel to the first light axis. The depolarization element is located between the at least one light source and the light homogenization element. In addition, projection apparatus is also provided.

18 Claims, 10 Drawing Sheets

(51) Int. Cl.
*G03B 21/20* (2006.01)
*G02B 27/28* (2006.01)

(58) Field of Classification Search
CPC ............ G03B 21/2073; G03B 21/2013; G03B 21/204
USPC .......................................................... 353/20
See application file for complete search history.

(56) References Cited

U.S. PATENT DOCUMENTS

| | | | |
|---|---|---|---|
| 8,264,668 B2* | 9/2012 | Fiolka | G03F 7/70566 355/71 |
| 2001/0052968 A1 | 12/2001 | Shiozawa | |
| 2003/0112436 A1 | 6/2003 | Yao | |
| 2007/0014504 A1 | 1/2007 | Fiolka | |
| 2009/0015811 A1 | 1/2009 | Kawakami | |
| 2015/0123739 A1* | 5/2015 | Nishida | G04F 5/145 331/94.1 |
| 2017/0104984 A1* | 4/2017 | Yamagishi | H04N 9/3164 |
| 2021/0072523 A1* | 3/2021 | Chen | G03B 21/28 |

FOREIGN PATENT DOCUMENTS

| | | |
|---|---|---|
| CN | 210573154 | 5/2020 |
| EP | 2767860 | 8/2014 |
| JP | 2003090978 | 3/2003 |
| TW | 200507055 | 2/2005 |
| WO | 2004104654 | 12/2004 |
| WO | 2019111237 | 6/2019 |

OTHER PUBLICATIONS

Office Action of China Counterpart Application, dated Jul. 2, 2021, pp. 1-6.
"Office Action of China Counterpart Application", dated Feb. 11, 2022, p. 1-p. 8.

* cited by examiner

LIGHTING SYSTEM AND PROJECTION APPARATUS

CROSS-REFERENCE TO RELATED APPLICATION

This application claims the priority benefit of Chinese application serial no. 201910635434.1, filed on Jul. 15, 2019. The entirety of the above-mentioned patent application is hereby incorporated by reference herein and made a part of this specification.

BACKGROUND

Technical Field

The present invention generally relates to an optical element and optical apparatus, in particular, to a lighting system and projection apparatus.

Description of Related Art

Projection apparatus is a display device configured to generate a large-sized picture, and has been continuously progressing with the evolution and innovation of technologies. The imaging principle of the projection apparatus is to convert an illuminating light beam generated by a lighting system into an image light beam via a light valve, and then project the image light beam through a projection lens to a projection target (such as a screen or a wall surface) to form a projection picture.

In addition, the lighting system has evolved to the current most advanced Laser Diode (LD) light source all the way from an ultra-high-performance (UHP) lamp and a light-emitting diode (LED) with the market requirements for the brightness, the color saturation, the service life, the nontoxicity, the environmental friendliness and the like of the projection apparatus. However, in the lighting system, the current economical method for producing red and green lights is to use a blue laser diode to emit an excitation light beam to a phosphor wheel, use the excitation light beam to excite fluorescent powder of the phosphor wheel to generate a yellow-green light, and use a filter element to filter the light to obtain a desired red or green light.

However, in the known lighting system structure, the polarization polarity of the excitation light beam is destroyed by an optical element inside the projection apparatus after the excitation light beam enters the projection apparatus, so that the polarization direction and intensity of the excitation light beam become disordered, thereby causing a problem of non-uniform brightness of a display picture. Therefore, if the projection apparatus generates a three-dimensional (3D) image display picture in a polarized 3D mode (a polarizer arranged on the outer side of a projection lens), an image projected from the projection lens and the polarizer is non-uniform in color or non-uniform in brightness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The present invention provides a lighting system and projection apparatus, which make the color or brightness of a display picture uniform under a polarized three-dimensional (3D) mode to allow a user to observe a 3D display picture with relatively high uniformity.

Other objectives and advantages of the present invention are further understood in the technical features disclosed by the present invention.

In order to achieve one or part or all of the above objectives or other objectives, one embodiment of the present invention provides a lighting system, comprising at least one light source, a depolarization element and a light homogenization element. The at least one light source is configured to provide at least one light beam. The depolarization element is disposed on a transmission path of the at least one light beam. The depolarization element comprises a first optical element, and the first optical element is provided with a first optical axis. The light homogenization element is configured to allow the at least one light beam to pass, so as to form an illuminating light beam. The incidence direction where the at least one light beam is transmitted to the first optical element is not parallel to the first optical axis, and the depolarization element is located between the at least one light source and the light homogenization element.

In order to achieve one or part or all of the above objectives or other objectives, another embodiment of the present invention provides projection apparatus, comprising a lighting system, at least one light valve and a projection lens. The lighting system is configured to provide an illuminating light beam, and comprises at least one light source, a depolarization element and a light homogenization element. The at least one light source is configured to provide at least one light beam. The depolarization element is disposed on a transmission path of the at least one light beam. The depolarization element comprises a first optical element, and the first optical element is provided with a first optical axis. The light homogenization element is configured to allow the at least one light beam to pass, so as to form the illuminating light beam. The at least one light valve is disposed on a transmission path of the illuminating light beam, and is configured to convert the illuminating light beam into an image light beam. The projection lens is disposed on a transmission path of the image light beam, and is configured to form the image light beam into a projection light beam. The incidence direction where the at least one light beam is transmitted to the first optical element is not parallel to the first optical axis, and the depolarization element is located between the at least one light source and the light homogenization element.

Based on the above, the embodiments of the present invention at least have one of the following advantages or effects. In the lighting system and projection apparatus of the present invention, the depolarization element comprises the first optical element provided with the first optical axis not parallel to the incident direction of light beam transmission, and the depolarization element is located between the light source and the light homogenization element. Therefore, the light beam penetrates through the depolarization element such that the light beam has different polarization states at different positions. In this way, the uniformity of the polarization states of the light beam is improved. Furthermore, if the present invention applied in the polarized 3D mode, an image with uniform color and brightness is generated on a screen, and then a user observes a 3D display picture with relatively high uniformity with polarized 3D glasses.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
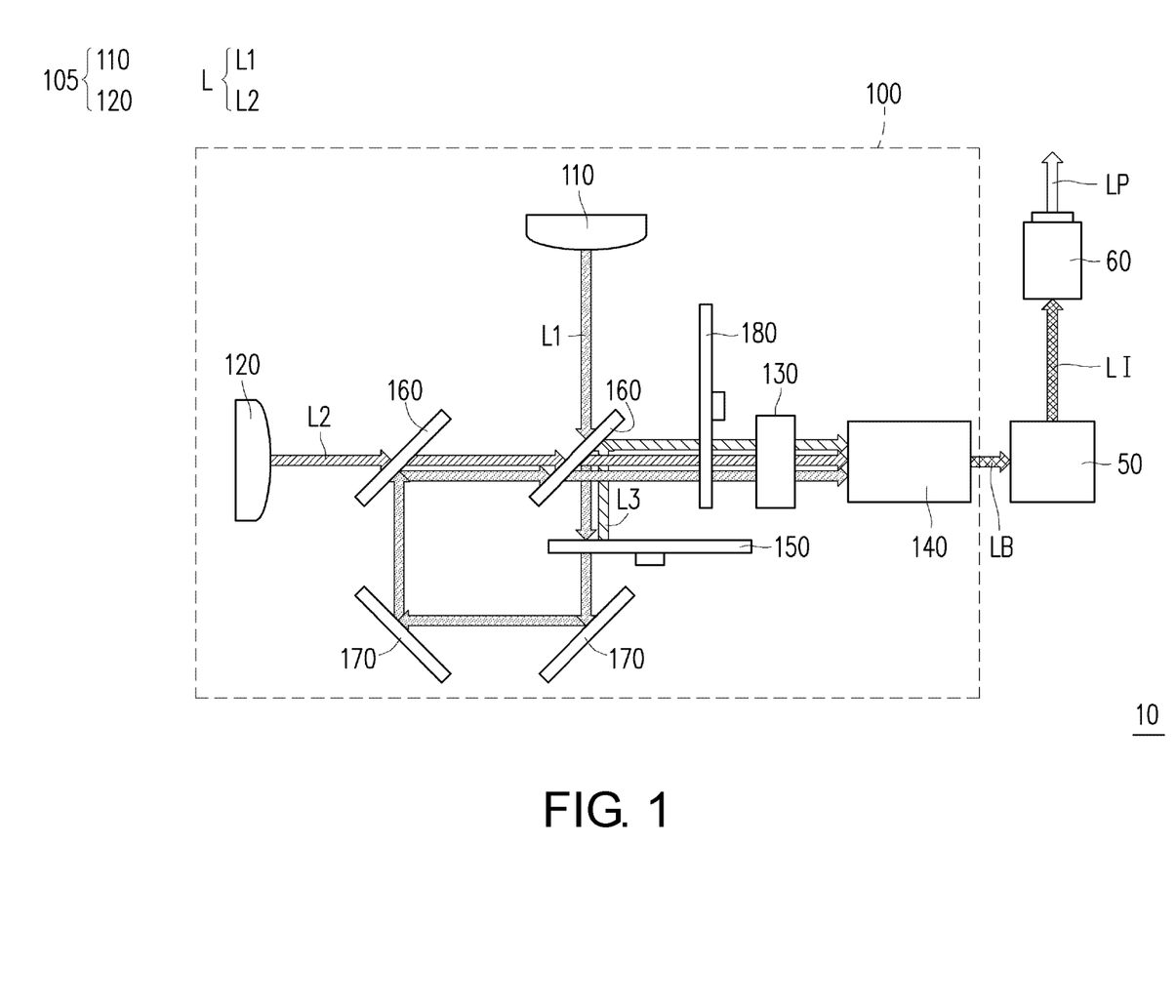
FIG. 1 is a schematic diagram of projection apparatus according to one embodiment of the present invention.

FIG. 1 is a schematic diagram of projection apparatus 10 according to one embodiment of the present invention. Referring to FIG. 1, in the present embodiment, the projection apparatus 10 is configured to provide a projection light beam LP. Specifically, the projection apparatus 10 includes a lighting system 100, at least one light valve 50 and a projection lens 60, and the lighting system 100 is configured to provide an illuminating light beam LB. The light valve 50 is disposed on a transmission path of the illuminating light beam LB, and is configured to convert the illuminating light beam LB into at least one image light beam LI. The so-called illuminating light beam LB is a light beam provided by the lighting system 100 to the at least one light valve 50. The projection lens 60 is disposed on a transmission path of the image light beam LI, and is configured to form the image light beam LI into a projection light beam LP. The projection light beam LP is projected to a projection target (not shown), such as a screen or a wall surface.

In a technology applied to three-dimensional (3D) displaying, the projection apparatus 100 of the present embodiment is used as a polarized 3D image projector. Specifically, when two pieces of projection apparatus 10 are in the polarized 3D mode (that is, a polarizer is disposed outside the projection lens 60 or polarizers are disposed inside the two pieces of projection apparatus 10), projection light beams LP provided by the two pieces of projection apparatus 10 respectively pass through the polarizers to generate images in different polarization states, thereby allowing a user to observe a 3D display picture through polarized 3D glasses. For example, the 3D glasses worn by the user are respectively provided with two polarization elements for left and right glasses lenses, and the two polarization elements correspond to the images, generated by the polarizers of the two pieces of projection apparatus 10, in the polarization states, so as to allow the left and right eyes of the user to respectively receive the images projected by the projector, thereby achieving a 3D display effect.

Specifically, in the present embodiment, the light valve 50 is, for example, a reflective light modulator such as a Liquid Crystal on Silicon (LCoS) panel or a Digital Micro-mirror Device (DMD). In some embodiments, the light valve 50 is also a penetrating light modulator such as a transparent liquid crystal panel, an electro-optical modulator, a maganeto-optic modulator and an Acousto-Optic Modulator (AOM). The present invention does not limit the number, shape and type of the light valve 50. Detailed steps and implementations of a method for converting the illuminating light beam LB into the image light beam LI by the light valve 50 are adequately taught, suggested and implemented by the general knowledge in the art, and descriptions thereof are omitted thereof. In the present embodiment, there is one light value 50. For example, 1-DMD projection apparatus 10 is used, but in other embodiments, there is a plurality of light valves, and the present invention is not limited thereto.

The projection lens 60 includes, for example, a combination of one or more optical lenses with a diopter, such as various combinations of non-planar lenses including a biconcave lens, a biconvex lens, a concavo-convex lens, a convex-concave lens, a plano-convex lens and a plano-concave lens. In one embodiment, the projection lens 60 also includes a planar optical lens that forms the image light beam LI from the light valve 50 into the projection light beam LP in a reflecting or penetrating manner and then projects the projection light beam LP to the projection target. The present invention does not limit the shape and type of the projection lens 60.

Moreover, in some embodiments, the projection apparatus 10 also optionally includes an optical element with a condensation, refraction or reflection function and is configured to guide the illuminating light beam LB emitted by the lighting system 100 to the light valve 50 and guide the image light beam LI emitted by the light valve 50 to the projection lens 60 to generate the projection light beam LP, but the present invention is not limited thereto.

The lighting system 100 includes at least one light source 105, a depolarization element 130 and a light homogenization element 140. Specifically, the lighting system 100 further includes a wavelength conversion element 150, at least one light splitting element 160, at least one reflecting element 170 and a filter device 180. In different embodiments, the varieties and quantities of the wavelength conversion element 150, the at least one light splitting element 160, the at least one reflecting element 170 and the filter device 180 may vary according to different types of lighting systems 100, and the present invention is not limited thereto.

The light source 105 is configured to provide at least one light beam L. Specifically, the light source 105 includes an excitation light source 110 and an auxiliary light source 120. The excitation light source 110 provides an excitation light beam L1, and the auxiliary light source 120 provides an auxiliary light beam L2. In the present embodiment, the excitation light source 110 is a Laser Diode (LD) capable of emitting a blue excitation light beam, and the auxiliary light source 120 is a LD capable of emitting a red excitation light beam or a Light Emitting Diode (LED) capable of emitting a red light beam. In other words, in the present embodiment, the light sources 105 are all laser light emitting devices.

The wavelength conversion element 150 is disposed on a transmission path of the excitation light beam L1 and located between the excitation light source 110 and the light homogenization element 140. In the present embodiment, the wavelength conversion element 150 is provided with a first region and a second region. The first region has a wavelength conversion material to convert the excitation light beam L1 into an excited light beam L3, and the second region of the wavelength conversion element 150 is, for example, a light transmittance plate or an opening configured to allow the excitation light beam L1 to penetrate. In the present embodiment, the wavelength conversion material of the first region is used for converting the blue excitation light beam into a green light beam or a yellow light beam or a yellow-green light beam. In different embodiments, the configuration of the wavelength conversion material of the wavelength conversion element 150 varies according to different types of lighting systems 100. The present invention does not limit the configuration and variety of the wavelength conversion element 150.

At least one light splitting element 160 is disposed on the transmission path of the excitation light beam L1 or the auxiliary light beam L2, and at least one reflecting element 170 is configured to reflect or conduct the excitation light beam LI. For example, in the present embodiment, the at least one light splitting element 160 includes a first light splitting element and a second light splitting element. The first light splitting element is located between the excitation light source 110 and the wavelength conversion element 150 in the transmission path of the excitation light beam LI. The first light splitting element is, for example, a Dichroic Mirror with Green and Orange reflection (DMGO) for allowing the blue excitation light beam L1 and the auxiliary light beam L2 to penetrate and allowing the excited light beam L3 to be reflected. The second light splitting element is located between the auxiliary light source 120 and the first light splitting element in the transmission path of the auxiliary light beam L2, and the second light splitting element is, for example, a Dichroic Mirror with Blue reflection (DMB) for allowing the blue excitation light beam L1 to be reflected and allowing the auxiliary light beam L2 to penetrate. Therefore, all the light beams are collected and transmitted to the depolarization element 130 via the filter device 180.

The filter device 180 is disposed between the light splitting element 160 and the depolarization element 130, and is provided with a plurality of different filters for filtering undesired wavelength ranges in the excitation light beam LI, the auxiliary light beam L2 and the excited light beam L3 and a light beam passing through a blue light wave range, a light beam passing through a red light wave range and a light beam passing through a green light wave range. Specifically, in the present embodiment, the filter device 180 is a rotatable color wheel device configured to generate a filter effect on the excitation light beam LI, the auxiliary light beam L2 or the excited light beam L3 according to the time sequence, so as to increase the color purity of a light beam passing through the filter device 180. In different embodiments, the configuration of filters of different colors in the filter device 180 varies according to different types of lighting systems 100. The present invention does not limit the configuration and variety of the filter device 180.

The light homogenization element 140 is configured to allow at least one light beam from the depolarization element 130 to pass, so as to form an illuminating light beam LB. Specifically, the light homogenization element 140 is configured to adjust the spot shape of the light beam, so that the spot shape of the illuminating light beam LB emitted from the light homogenization element 140 is matched with the shape (such as a rectangular shape) of a working region of the light valve 50, and each portion of a light spot has consistent or similar light intensity. In the present embodiment, the light homogenization element 140 is, for example, a light integrated rod, but in other embodiments, the light homogenization element 140 is also other optical elements of other shapes, such as a lens array. The present invention is not limited thereto.

Figure 2:
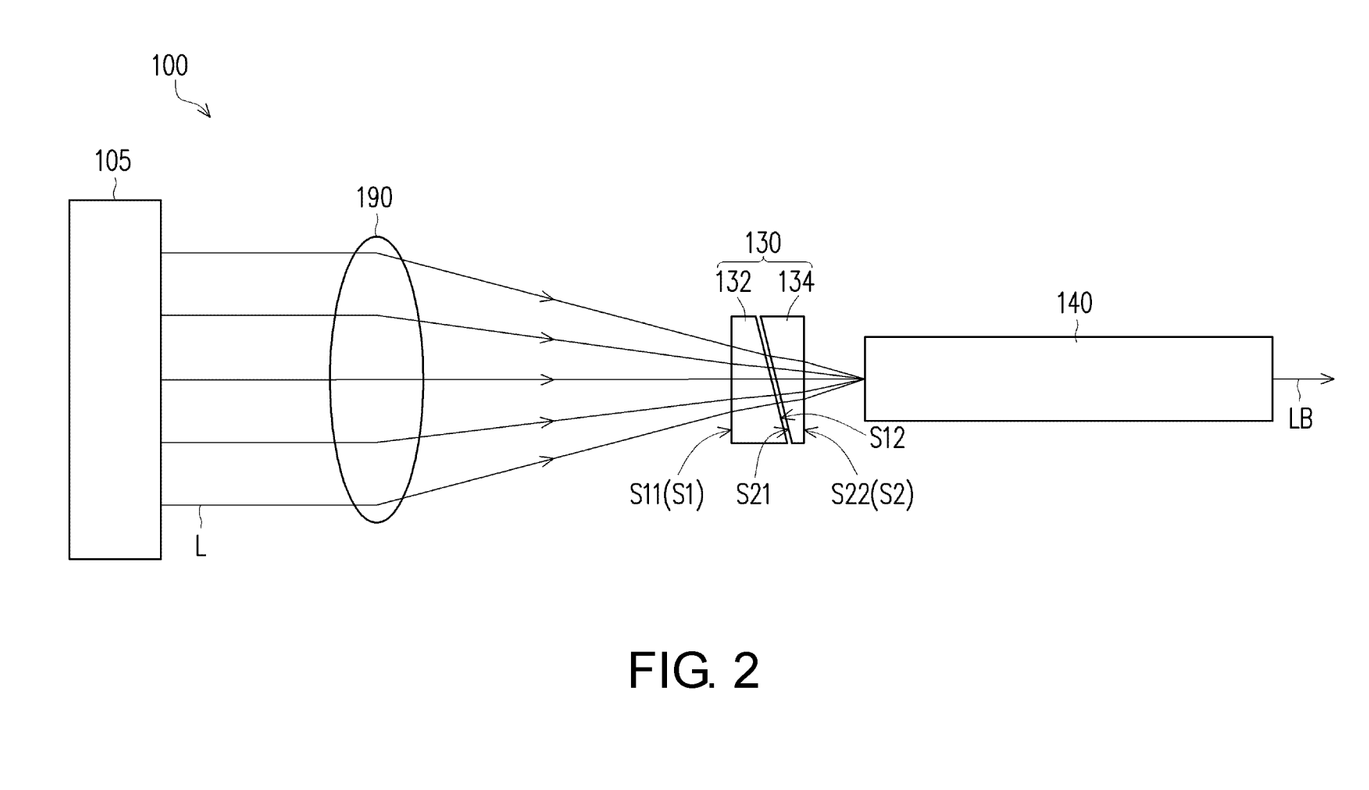
FIG. 2 is a schematic diagram of a partial lighting system according to one embodiment of the present invention.
Figure 3:
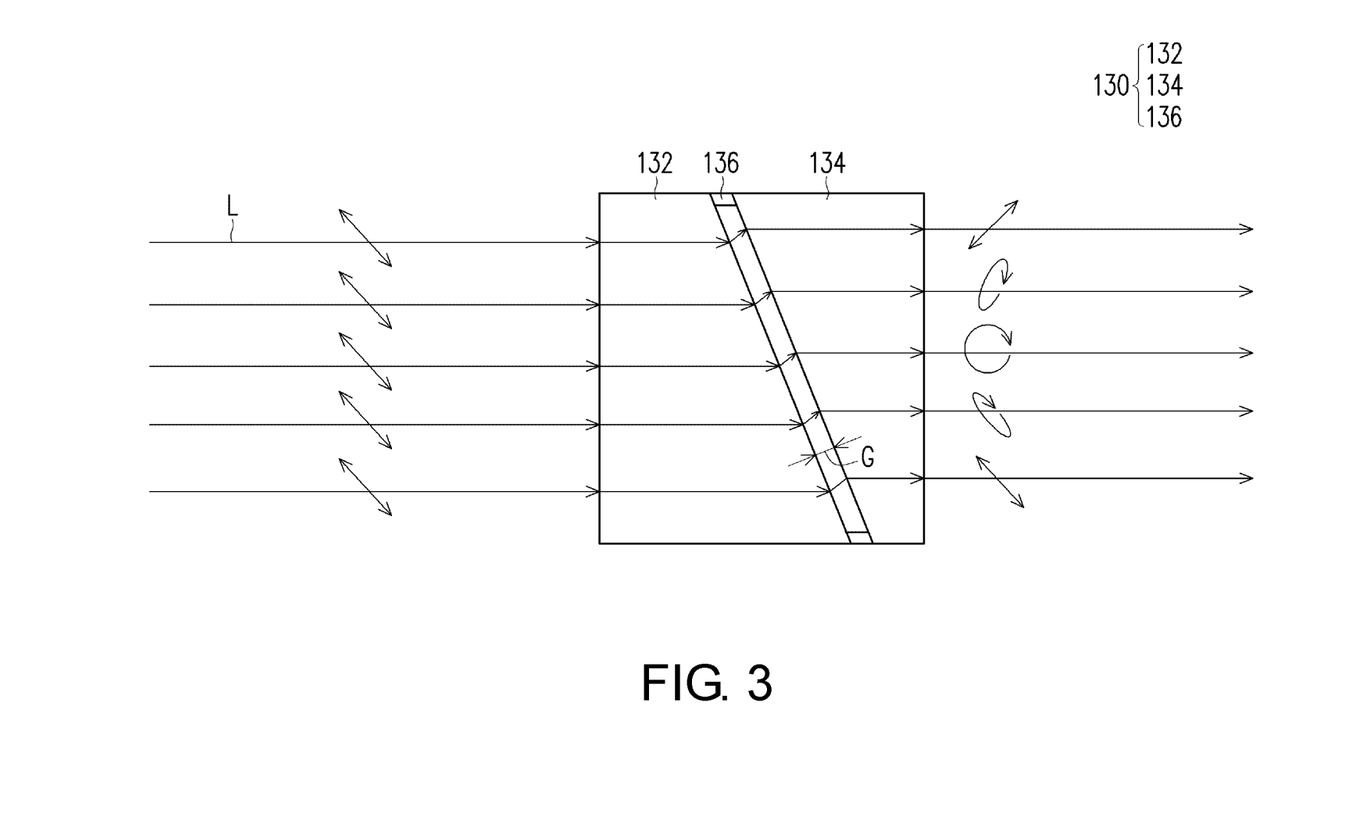
FIG. 3 is a schematic diagram of a depolarization element of FIG. 2.

FIG. 2 is a schematic diagram of a partial lighting system according to one embodiment of the present invention, and FIG. 3 is a schematic diagram of a depolarization element of FIG. 2. For convenience of description, the light source 105 shown in FIGS. 2 and 3 and the light beam L provided are only schematically shown, but the partial lighting system 100 shown in FIG. 2 is applied at least to the projection apparatus 10 shown in FIG. 1, and the present invention is not limited thereto. Therefore, the lighting system 100 applied to the projection apparatus 10 will be described below. The depolarization element 130 is disposed on the transmission path of the light beam L, and is located between the light source 105 and the light homogenization element 140. In this way, the light beam L is caused to enter the depolarization element 130 before entering the light homogenization element 140, so that the uniformity of the polarization states of the light beam L is improved at first, and then the uniformity of the light beam L is improved, so as to present an image with relatively good color and uniform brightness. In the present embodiment, the depolarization element 130 is provided with a light entering surface S1 and a light exiting surface S2. The light entering surface S1 is parallel to the light exiting surface S2, but the present invention is not limited thereto. In addition, in the present embodiment, at least one portion of the depolarization element 130 has a birefringence characteristic, and the direction of the optical axis of the portion having the birefringence characteristic is not parallel to the incident direction where the light beam L is transmitted to the depolarization element 130. Specifically, the depolarization element 130 includes a first optical element 132 and a second optical element 134. The first optical element 132 is provided with a first optical axis, and the second optical element 134 is provided with a second optical axis. The first optical axis is not parallel to the second optical axis. For example, an included angle between the first optical axis and the second optical axis is between 40 degrees and 50 degrees, but the present invention is not limited thereto. In other words, in the present embodiment, the incident direction where the light beam L is transmitted to the first optical element 132 is not parallel to the first optical axis. Therefore, the light beam L is caused to generate different polarization states at different incident positions after passing through the first optical element 132. In this way, when the projection apparatus 10 is in the polarized 3D mode, the color or brightness of a display picture is made uniform, and the user observes a 3D display picture with relatively high uniformity.

The material of the first optical element 132 is different from the material of the second optical element 134. In the present embodiment, the first optical element 132 is made of a material having the birefringence characteristic, such as crystalline quartz. The second optical element 134 is then made of a material having a similar refractive index to the first optical element 132, such as fused quartz. The direction of the first optical axis of the first optical element 132 is also the direction of the optical axis of crystal of the crystalline quartz. Since the fused quartz is not provided with optical axis of crystal, the second optical element 134 is not provided with a second optical axis. In other embodiments, the second optical element 134 is also made of other materials, and the direction of the second optical axis of the second optical element 134 is the direction of the optical axis of crystal of the material of the second optical element 134.

In the present embodiment, the lighting system 100 further includes a focusing element 190, disposed on the transmission path of the light beam L and located between the light source 105 and the depolarization element 130. The focusing element 190 is, for example, a focusing lens for focusing the light beam L to allow the light beam L to pass through the depolarization element 130 to be received by the light homogenization element 140.

For a geometrical shape of the structure, in the present embodiment, the first optical element 132 is provided with a first light entering surface S11 (i.e., the light entering surface S1 of the depolarization element 130) and a first light exiting surface S12 which are not parallel to each other, and the second optical element 134 is provided with a second light entering surface S21 and a second light exiting surface S22 (i.e., the light exiting surface S2 of the depolarization element 130) which are not parallel to each other. The first light exiting surface S12 is parallel to the second light entering surface S21, and the first light entering surface S11 is parallel to the second light exiting surface S22. The first light entering surface S11 is perpendicular to the incident direction of the light beam L. Specifically, the light path direction of a main light beam of the light beam L is the incident direction of the light beam L. Therefore, the shape of the first optical element 132 is geometrically symmetrical with the shape of the second optical element 134, as viewed from a side view, and the geometrical shapes of the first optical element 132 and the second optical element 134 are, for example, like a trapezoidal cylinder, as shown in FIG. 3.

In addition, in the present embodiment, a gap G is reserved between the first optical element 132 and the second optical element 134. The first light exiting surface S12 and the second light entering surface S21 respectively form an included angle with more than 1 degree with the first light entering surface S11, but the present invention is not limited thereto. Specifically, the depolarization element 130 further includes a connection piece 136 connected between the first optical element 132 and the second optical element 134. In the present embodiment, the connection piece 136 is, for example, of a solid ringlike structure, disposed between the first optical element 132 and the second optical element 134 to reserve the gap G between the first optical element 132 and the second optical element 134. In other embodiments, the connection piece 136 is, for example, light transmittance glue which connects the first optical element 132 to the second optical element 134 in an adhering manner. The thickness of the light transmittance glue is equal to the gap G between the first optical element 132 and the second optical element 134, but the present invention is not limited thereto. In other embodiments, the connection piece 136 is a clip for clamping the first optical element 132 and the second optical element 134, or the connection piece 136 is omitted as needed to directly connect the first optical element 132 to the second optical element 134. The first light exiting surface S12 is inclined to the first light entering surface S11 by more than 1 degree.

When the light beam L is incident to the depolarization element 130, the light beam L is transmitted from the first light entering surface S11 of the first optical element 132 into the first optical element 132, and is transmitted and emitted by the second light exiting surface S22 of the second optical element 134. After being transmitted through the first optical element 132, the polarization state of the light beam L is changed due to the birefringence characteristic of the first optical element 132, and the change in the polarization state is based on a travel of the light beam L in the first optical element 132. After being transmitted through the second optical element 134, the light beam L compensates for a deflection angle caused by refraction as the light beam L passes through the first optical element 132, due to the geometrical symmetry of the second optical element 134. In other words, since the first optical element 132 is provided with the first light entering surface S11 and the first light exiting surface S12 which are not parallel to each other, the light beam L transmitted at different positions generates polarization state changes corresponding to light paths. As shown in FIG. 3, when the linearly polarized light beam L is transmitted through the depolarization element 130 at different positions, the light beam L will be changed into light beams linearly polarized in different directions, elliptically polarized in different directions and circularly polarized in different directions. In this way, the uniformity of the polarization states of the light beam L is improved. Under the polarized 3D mode, an image with uniform color and brightness is generated on a screen, and then the user observes a 3D display picture with relatively high uniformity with polarized 3D glasses.

Figure 4:
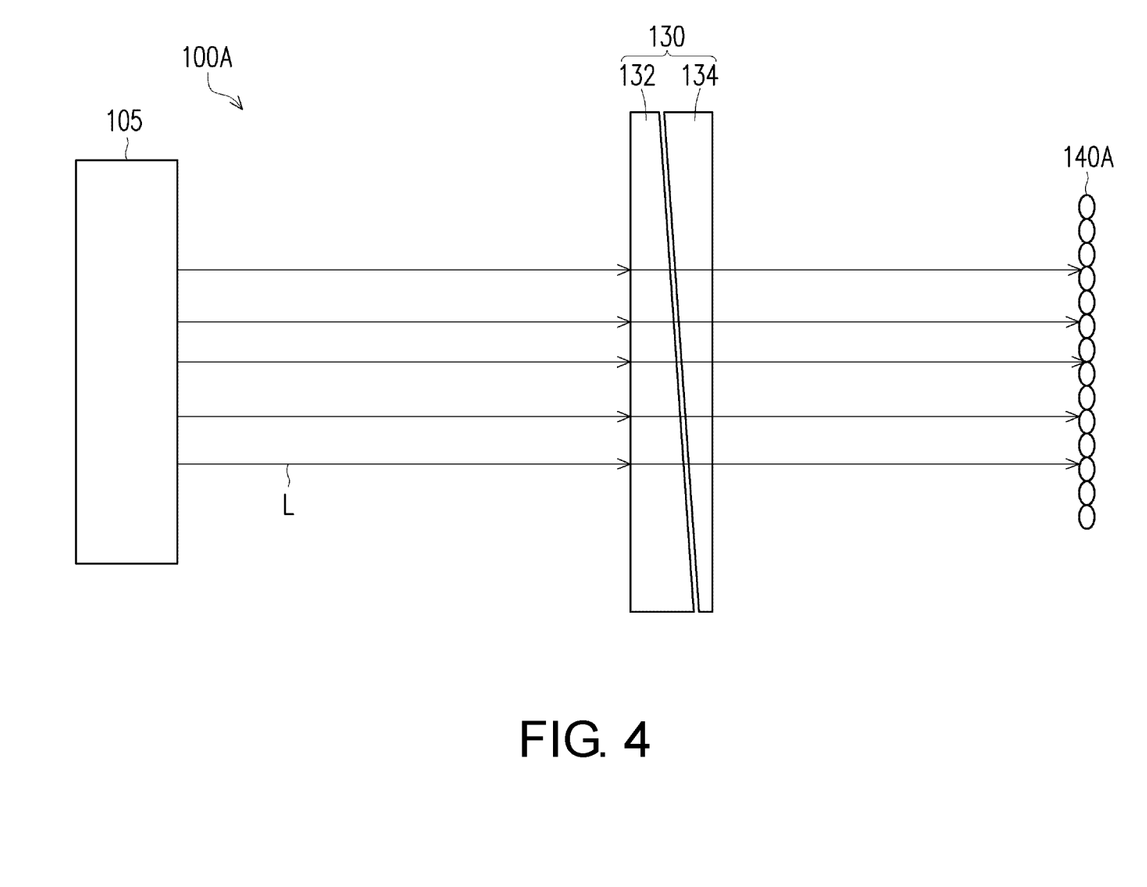
FIG. 4 is a schematic diagram of a partial lighting system according to another embodiment of the present invention.

FIG. 4 is a schematic diagram of a partial lighting system 100A according to another embodiment of the present invention. Referring to FIG. 4, the lighting system 100A of the present embodiment is similar to the lighting system 100 shown in FIG. 2. The difference therebetween is that in the present embodiment, a light homogenization element 140A in the lighting system 100A is a lens array. In this way, the focusing element 190 shown in FIG. 2 is omitted from the lighting system 100A.

Figure 5:
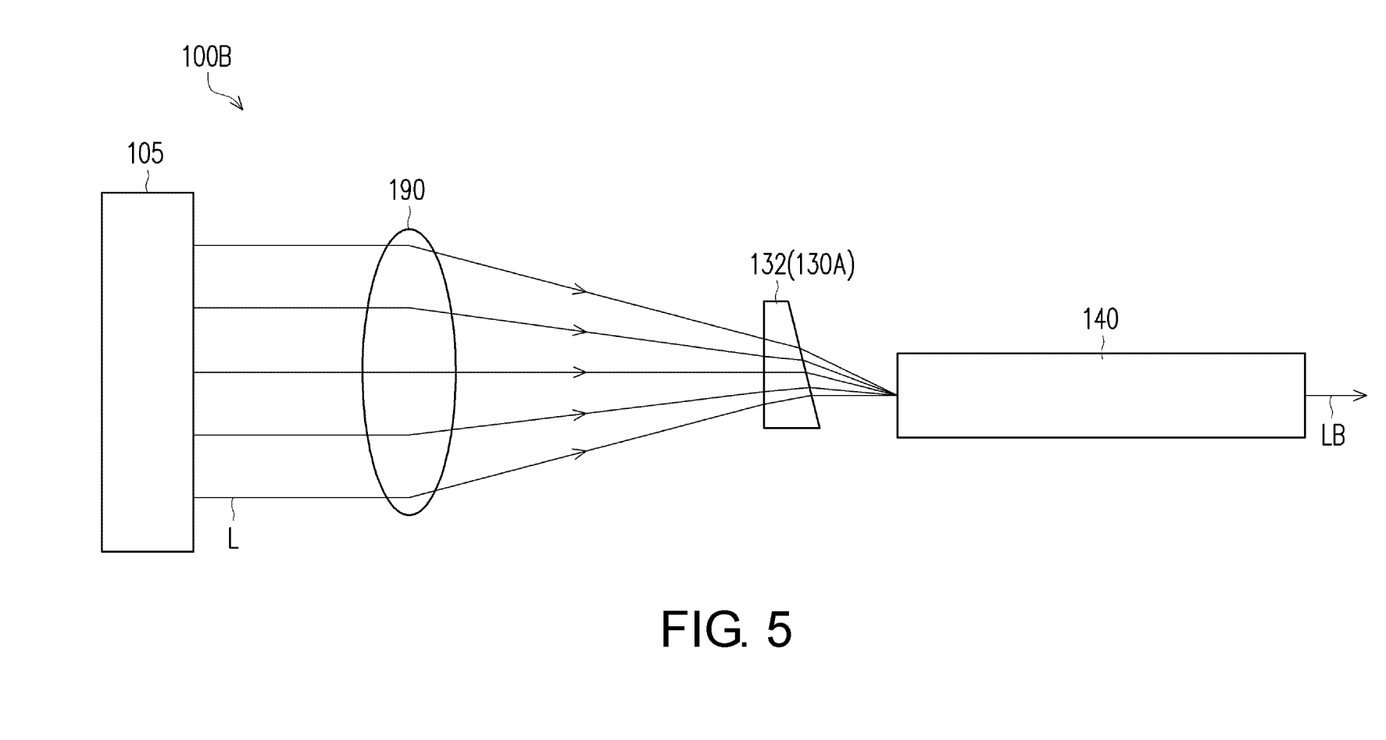
FIG. 5 is a schematic diagram of a partial lighting system according to a further embodiment of the present invention.

FIG. 5 is a schematic diagram of a partial lighting system 100B according to a further embodiment of the present invention. Referring to FIG. 5, the lighting system 100B of the present embodiment is similar to the lighting system 100 shown in FIG. 2. The difference therebetwen is that in the present embodiment, a depolarization element 130A in the lighting system 100B is only composed of the first optical element 132, and a relative position between the light homogenization element 140 and the depolarization element 130A is finely adjusted to cause the light beam L to be converged and transmitted into the light homogenization element 140. In this way, the lighting system 100B further reduces the cost of use of the second optical element 134.

Figure 6:
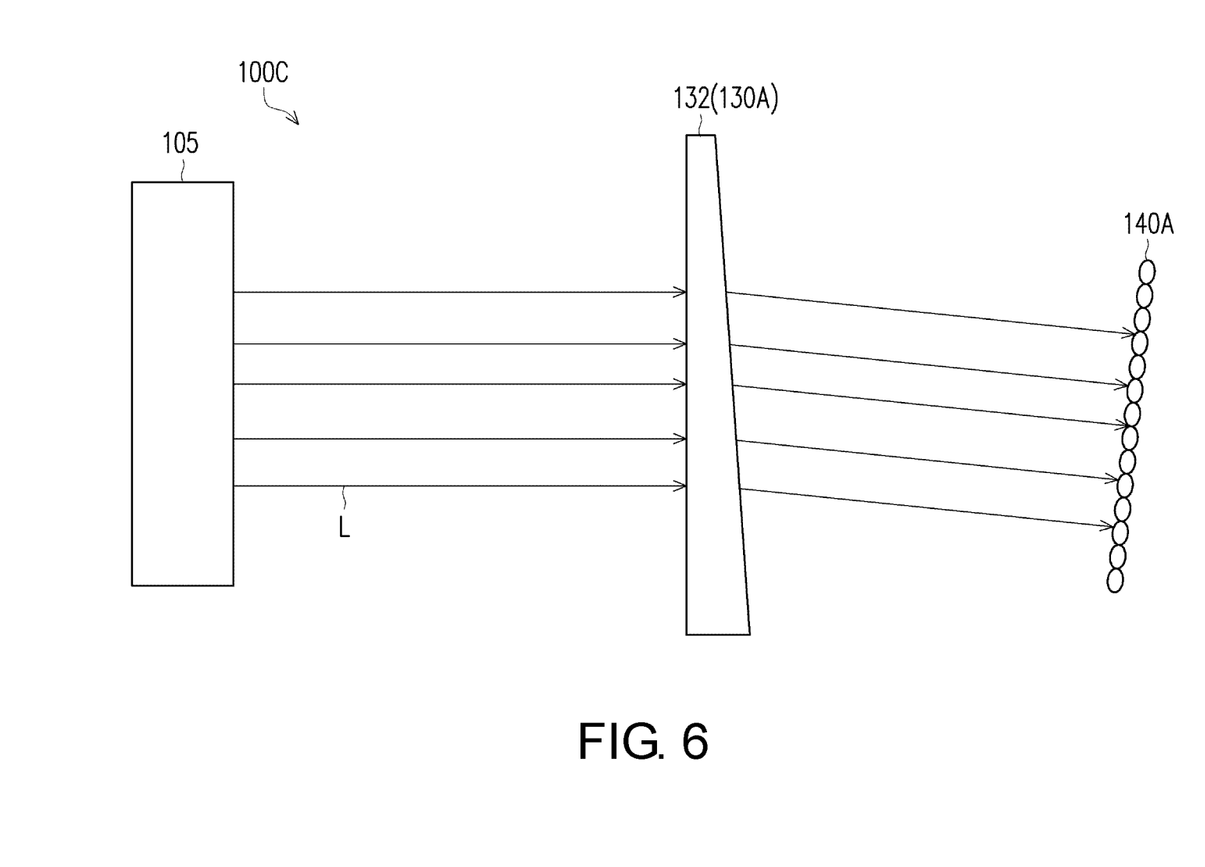
FIG. 6 is a schematic diagram of a partial lighting system according to a further more embodiment of the present invention.

FIG. 6 is a schematic diagram of a partial lighting system 100B according to a further more embodiment of the present invention. Referring to FIG. 6, the lighting system 100C of the present embodiment is similar to the lighting system 100A shown in FIG. 4. The difference therebetwen is that in the present embodiment, the depolarization element 130A in the lighting system 100C is only composed of the first optical element 132, and a placement angle of the light homogenization element 140A is finely adjusted to cause the light beam L to be transmitted into the light homogenization element 140A. In this way, the lighting system 100C further saves the material of the second optical element 134 and reduces the cost of the depolarization element 130A.

Figure 7:
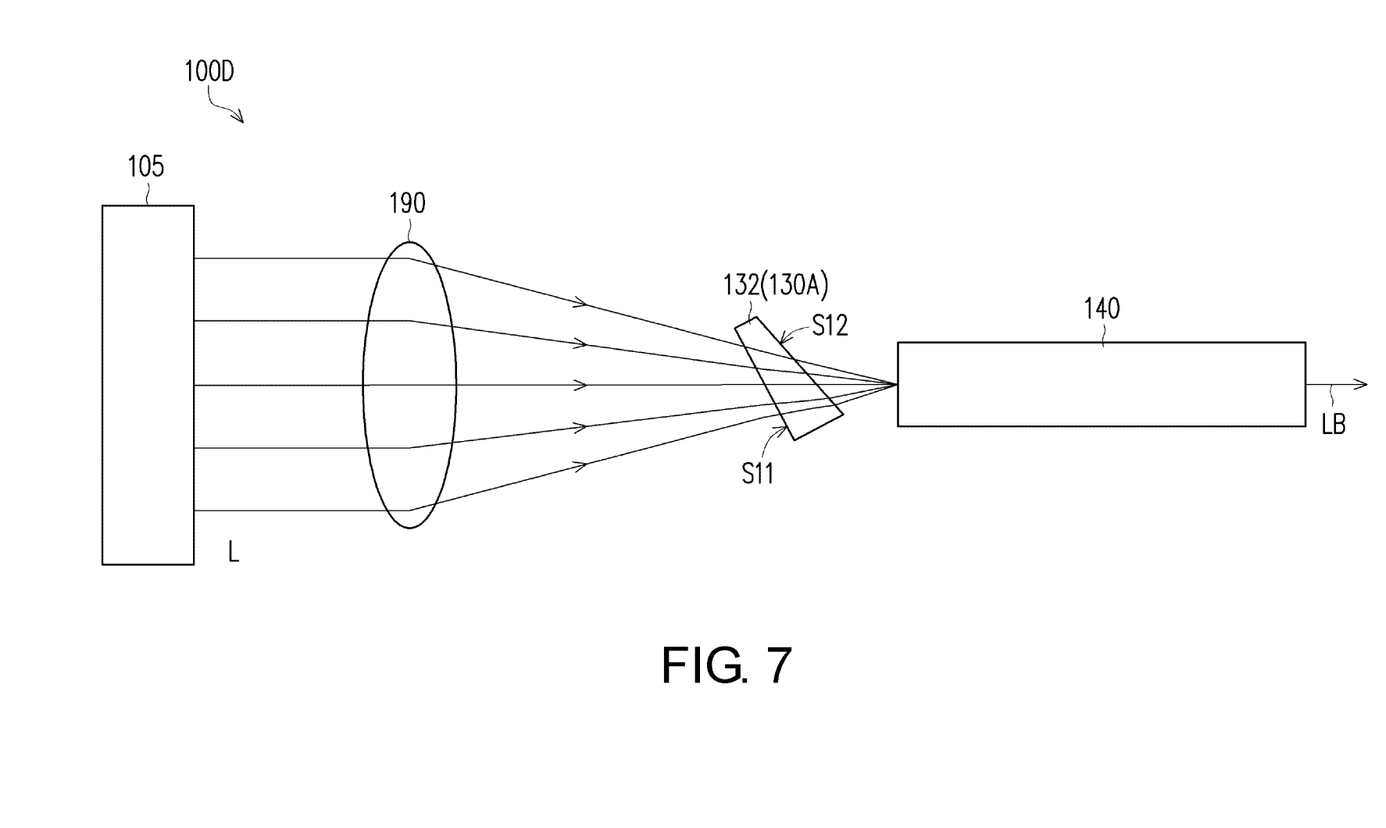
FIG. 7 is a schematic diagram of a partial lighting system according to a further more embodiment of the present invention.

FIG. 7 is a schematic diagram of a partial lighting system 100D according to a further more embodiment of the present invention. Referring to FIG. 7, the lighting system 100D of the present embodiment is similar to the lighting system 100B shown in FIG. 5. The difference therebetween is that in the present embodiment, the first light entering surface S11 of the first optical element 132 in the lighting system 100D is not perpendicular to the incident direction of the light beam L. In the present embodiment, the first optical element 132 is adjusted to a specific angle by use of, for example, the refractive deflection characteristic, so as to cause the light beam L to still keep moving forwards along the same optical axis after the light beam is emitted from the first light exiting surface S12. In this way, the lighting system 100D does not need to further adjust the placement position of the light homogenization element 140.

Figure 8:
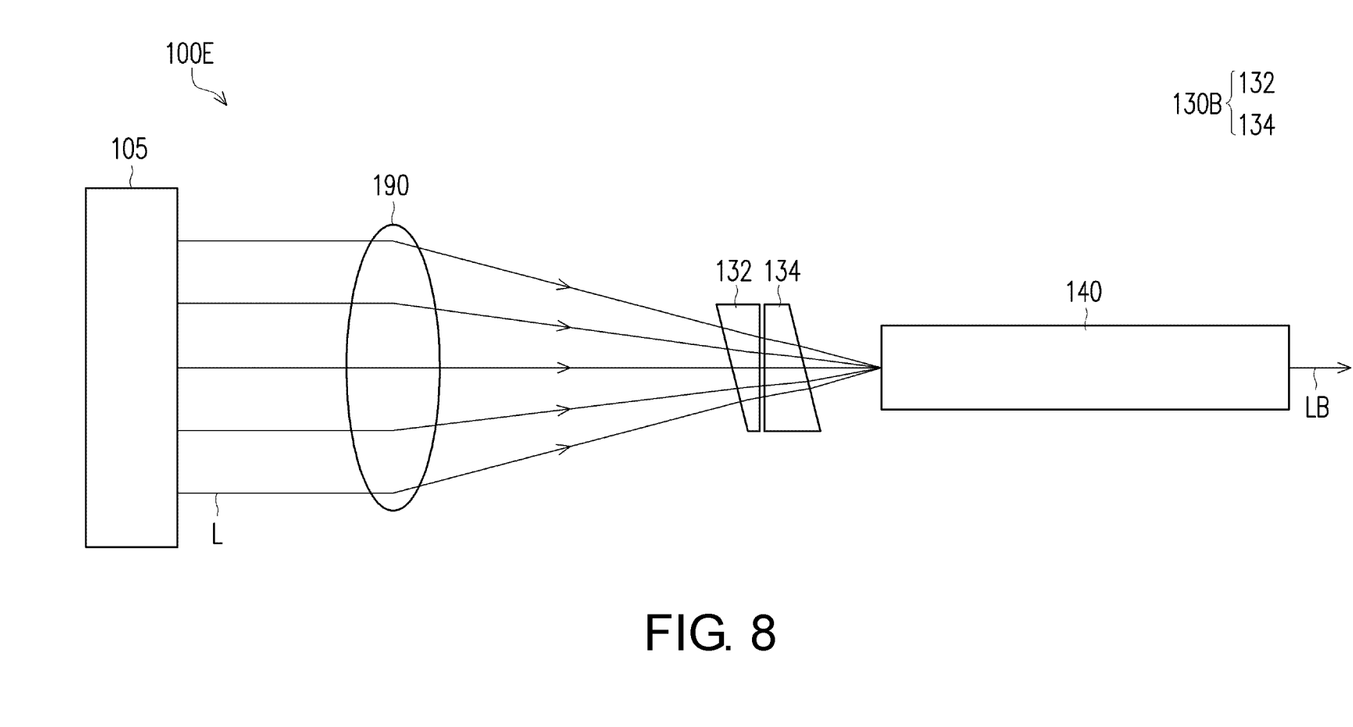
FIG. 8 is a schematic diagram of a partial lighting system according to a further more embodiment of the present invention.

FIG. 8 is a schematic diagram of a partial lighting system 100E according to a further more embodiment of the present invention. Referring to FIG. 8, the lighting system 100E of the present embodiment is similar to the lighting system 100 shown in FIG. 2. The difference therebetween is that in the present embodiment, the first optical element 132 and the second optical element 134 of a depolarization element 130B in the lighting system 100E are inversely placed in the front and back direction when compared with the optical elements in FIG. 2. Therefore, the light beam L generates uniform polarization states via the first optical element 132 and compensates for a deflection caused by the refraction via the second optical element 134.

Figure 9:
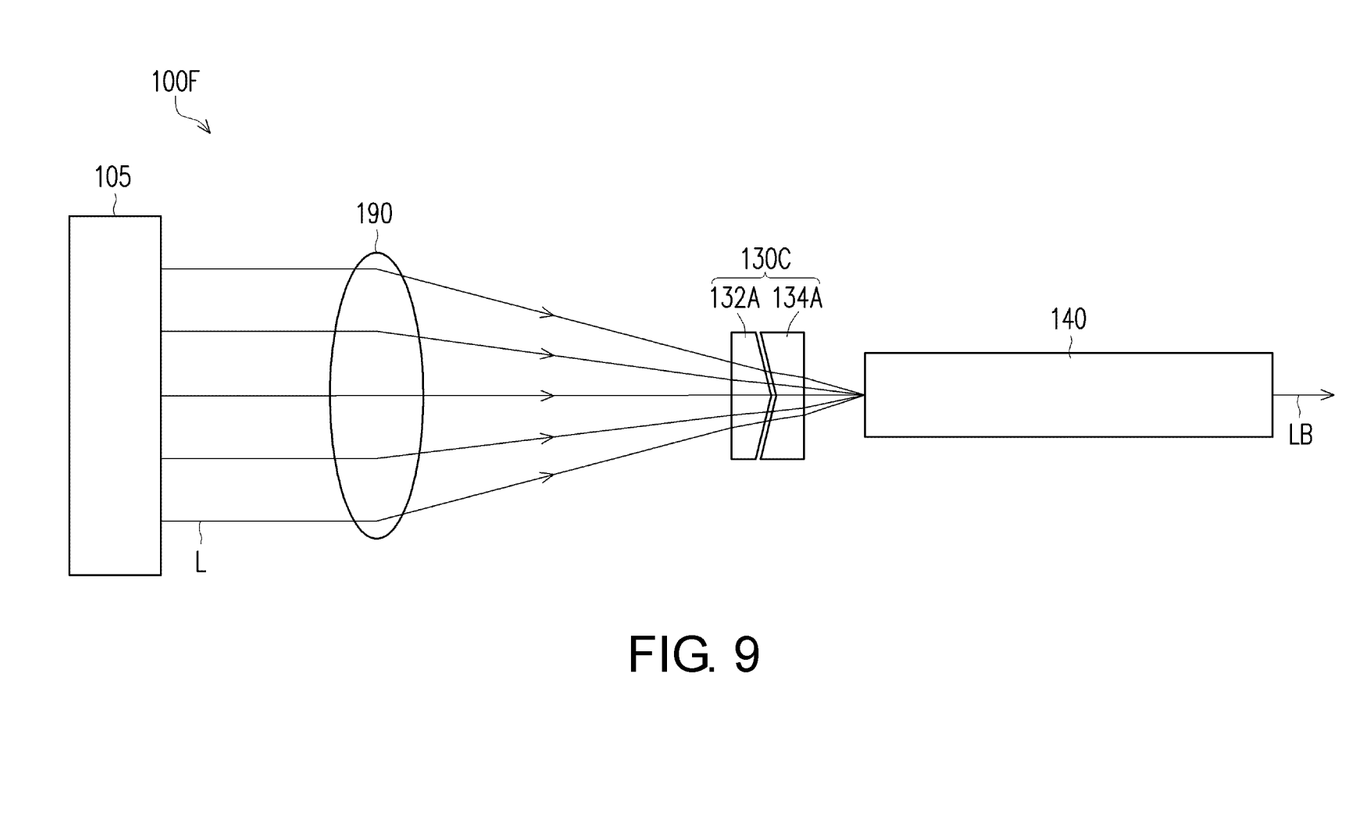
FIG. 9 is a schematic diagram of a partial lighting system according to a further more embodiment of the present invention.

FIG. 9 is a schematic diagram of a partial lighting system 100F according to a further more embodiment of the present invention. Referring to FIG. 9, the lighting system 100F of the present embodiment is similar to the lighting system 100 shown in FIG. 2. The difference therebetween is that in the present embodiment, a first optical element 132A and a second optical element 134A of a depolarization element 130C in the lighting system 100F are in non-geometrical symmetry. For example, in the present embodiment, the first optical element 132A is a composite light transmittance sheet with a thicker central portion and a thinner peripheral portion, and the second optical element 134A is a composite light transmittance sheet with a thinner central portion and a thicker peripheral portion. Therefore, in the present embodiment, the light beam L still generates uniform polarization states via the first optical element 132A, and compensates for a deflection caused by the refraction via the second optical element 134A. In this way, the uniformity of the polarization states of the light beam L is improved. Under the polarized 3D mode, an image with uniform color and brightness is generated on a screen, and then the user observes a 3D display picture with relatively high uniformity with polarized 3D glasses.

Figure 10:
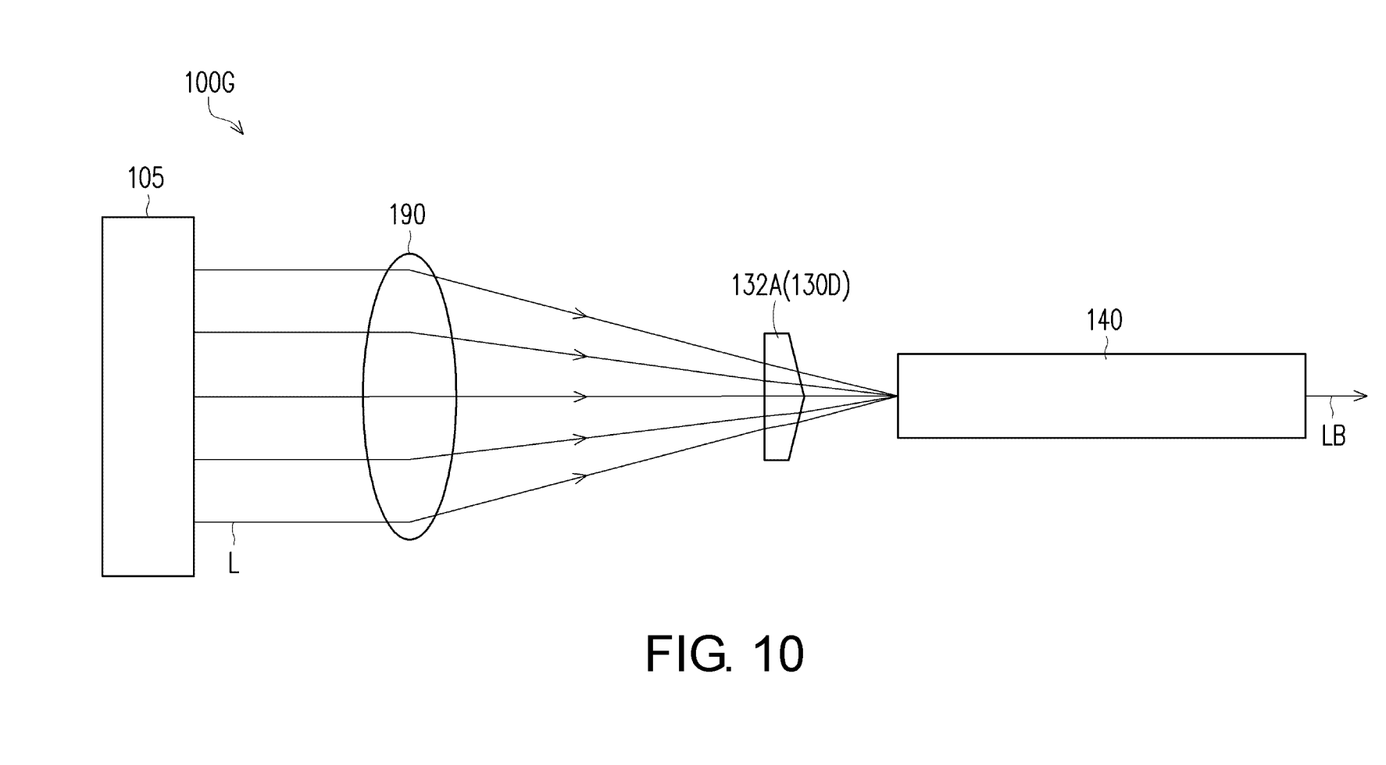
FIG. 10 is a schematic diagram of a partial lighting system according to a further more embodiment of the present invention.

FIG. 10 is a schematic diagram of a partial lighting system 100G according to a further more embodiment of the present invention. Referring to FIG. 10, the lighting system 100G of the present embodiment is similar to the lighting system 100F shown in FIG. 9. The difference therebetween is that in the present embodiment, a depolarization element 130D in the lighting system 100G is not provided with the second optical element 134A when compared to the depolarization element 130C shown in FIG. 9. In other words, in the present embodiment, the depolarization element 130D is composed of the first optical element 132A with a thicker central portion and a thinner peripheral portion. Therefore, in the present embodiment, the light beam L still generates uniform polarization states via the first optical element 132A, and the depolarization element 130D avoids a deflection of the light beam L caused by the refraction since the surface shape of the first light exiting surface S12 of the first optical element 132A is a geometrical shape presented by taking the incident direction of the light beam L as asymmetry axis. In this way, the uniformity of the polarization states of the light beam L is improved. Furthermore, if the present invention applied in the polarized 3D mode, an image with uniform color and brightness is generated on a screen, and then the user observes a 3D display picture with relatively high uniformity with polarized 3D glasses.

Based on the above, the embodiments of the present invention at least have one of the following advantages or effects. In the lighting system and projection apparatus of the present invention, the depolarization element includes the first optical element provided with the first optical axis not parallel to the incident direction where the light beam is transmitted, and the depolarization element is located between the light source and the light homogenization element. Therefore, the light beam penetrates through the depolarization element such that the light beam has different polarization states at different positions. In this way, the uniformity of the polarization states of the light beam is improved. Furthermore, Uif the present invention applied in the polarized 3D mode, the image with uniform color and brightness is generated on the screen, and then the user observes the 3D display picture with relatively high uniformity with the polarized 3D glasses.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lighting system, comprising at least one light source, a depolarization element and a light homogenization element, wherein
    the at least one light source is configured to provide at least one light beam;
    the depolarization element is disposed on a transmission path of the at least one light beam; the depolarization element comprises a first optical element, and the first optical element comprises a first optical axis;
    the depolarization element also comprises a second optical element comprising a second optical axis, and the first optical axis is not parallel to the second optical axis;
    the first optical element comprises a first light entering surface and a first light exiting surface which are not parallel to each other, and the second optical element comprises a second light entering surface and a second light exiting surface which are not parallel to each other, the first light exiting surface is parallel to the second light entering surface, and the first light entering surface is parallel to the second light exiting surface; and
    the light homogenization element is configured to allow the at least one light beam to pass, so as to form an illuminating light beam, wherein the incidence direction where the at least one light beam is transmitted to the first optical element is not parallel to the first optical axis, and the depolarization element is located between the at least one light source and the light homogenization element.

2. The lighting system according to claim 1, wherein the depolarization element comprises a light entering surface and a light exiting surface, and the light entering surface is parallel to the light exiting surface.

3. The lighting system according to claim 1, wherein the the first light entering surface is perpendicular to the incident direction.

4. The lighting system according to claim 3, wherein the surface shape of the first light exiting surface is a geometrical shape with a symmetry axis.

5. The lighting system according to claim 1, wherein the first light entering surface is not perpendicular to the incident direction.

6. The lighting system according to claim 5, wherein the surface shape of the first light exiting surface is a geometrical shape with a symmetry axis.

7. The lighting system according to claim 1, wherein an included angle between the first optical axis and the second optical axis is between 40 degrees and 50 degrees.

8. The lighting system according to claim 1, wherein the lighting system also comprises:
    a focusing element, disposed on the transmission path of the at least one light beam and located between the at least one light source and the depolarization element.

9. A lighting system, comprising at least one light source, a depolarization element and a light homogenization element, wherein
    the at least one light source is configured to provide at least one light beam;
    the depolarization element is disposed on a transmission path of the at least one light beam; the depolarization element comprises a first optical element, and the first optical element comprises a first optical axis;
    the light homogenization element is configured to allow the at least one light beam to pass, so as to form an illuminating light beam, wherein the incidence direction where the at least one light beam is transmitted to the first optical element is not parallel to the first optical axis, and the depolarization element is located between the at least one light source and the light homogenization element;
    the depolarization element also comprises a second optical element comprising a second optical axis, and the first optical axis is not parallel to the second optical axis; and
    the shape of the first optical element and the shape of the second optical element are in geometrical symmetry.

10. A lighting system, comprising at least one light source, a depolarization element and a light homogenization element, wherein
    the at least one light source is configured to provide at least one light beam;
    the depolarization element is disposed on a transmission path of the at least one light beam; the depolarization element comprises a first optical element, and the first optical element comprises a first optical axis;
    the light homogenization element is configured to allow the at least one light beam to pass, so as to form an illuminating light beam, wherein the incidence direction where the at least one light beam is transmitted to the first optical element is not parallel to the first optical axis, and the depolarization element is located between the at least one light source and the light homogenization element;

the depolarization element also comprises a second optical element comprising a second optical axis, and the first optical axis is not parallel to the second optical axis; and the material of the second optical element is different from the material of the first optical element.

11. The lighting system according to claim 1, wherein a gap is reserved between the first optical element and the second optical element.

12. The lighting system according to claim 11, wherein the first light exiting surface and the second light entering surface are respectively inclined to the first light entering surface by more than 1 degree.

13. The lighting system according to claim 1, wherein the depolarization element also comprises a connection piece, connected between the first optical element and the second optical element.

14. The lighting system according to claim 13, wherein the first light exiting surface is inclined to the first light entering surface by more than 1 degree.

15. A projection apparatus, comprising a lighting system, at least one light valve and a projection lens, wherein the lighting system is configured to provide an illuminating light beam, the lighting system comprises at least one light source, a depolarization element and a light homogenization element;

the at least one light source is configured to provide at least one light beam;

the depolarization element is disposed on a transmission path of the at least one light beam; the depolarization element comprises a first optical element, and the first optical element comprises a first optical axis;

the depolarization element also comprises a second optical element comprising a second optical axis, and the first optical axis is not parallel to the second optical axis;

the first optical element comprises a first light entering surface and a first light exiting surface which are not parallel to each other, and the second optical element comprises a second light entering surface and a second light exiting surface which are not parallel to each other; the first light exiting surface is parallel to the second light entering surface; and the first light entering surface is parallel to the second light exiting surface;

the light homogenization element is configured to allow the at least one light beam to pass, so as to form an illuminating light beam, wherein the incidence direction where the at least one light beam is transmitted to the first optical element is not parallel to the first optical axis, and the depolarization element is located between the at least one light source and the light homogenization element;

the at least one light valve is disposed on a transmission path of the illuminating light beam and configured to convert the illuminating light beam into an image light beam; and the projection lens is disposed on a transmission path of the image light beam and configured to form the image light beam into a projection light beam.

16. The projection apparatus according to claim 15, wherein the depolarization element comprises a light entering surface and a light exiting surface, and the light entering surface is parallel to the light exiting surface.

17. The projection apparatus according to claim 15, wherein the first light entering surface is perpendicular to the incident direction.

18. The projection apparatus according to claim 15, wherein the first light entering surface is not perpendicular to the incident direction.

* * * * *